INVENTORS
RONALD R. PROCTOR
DON J. WANGELIN
BY
Edward H. Lang
ATTORNEY

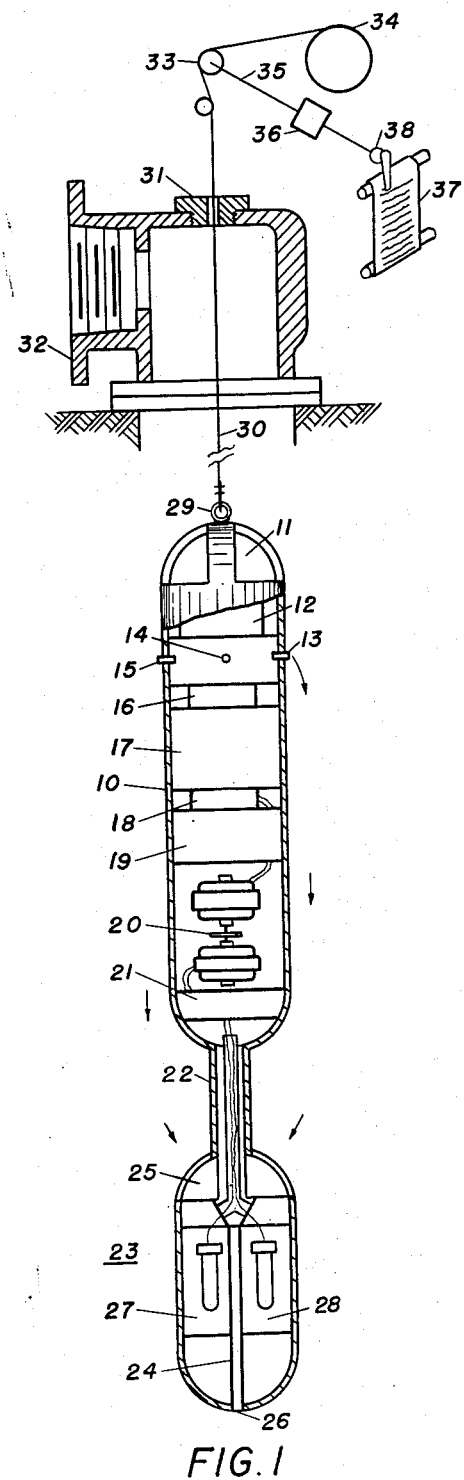
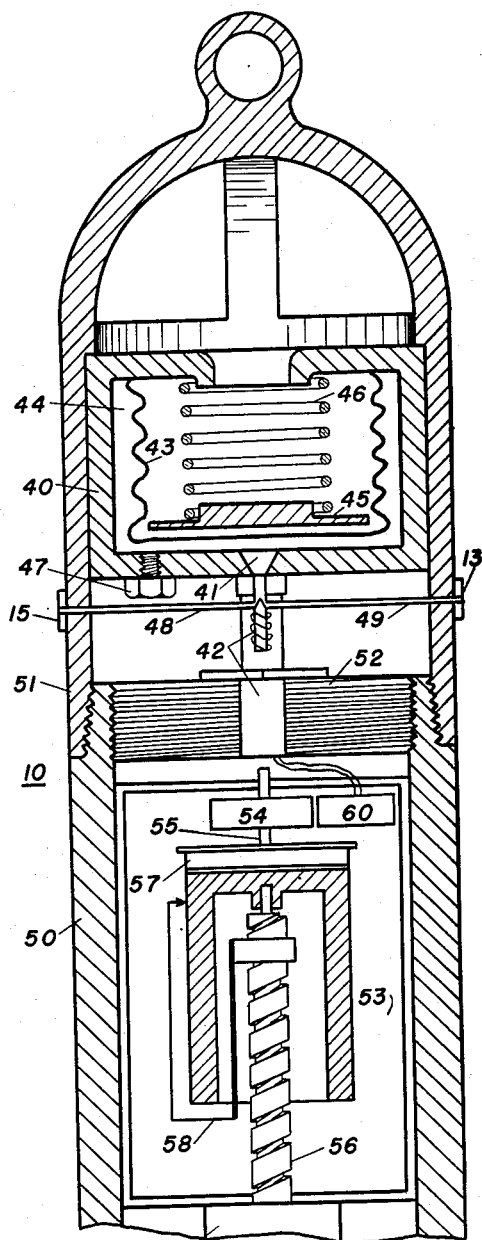
FIG.1
FIG.2
INVENTORS
RONALD R. PROCTOR
DON J. WANGELIN
BY
Thomas J Graham
ATTORNEY May 25, 1954    R. R. PROCTOR ET AL    2,679,182
APPARATUS FOR MEASURING CHANGES IN FLUID FLOW VELOCITY
Filed Aug. 26, 1948    2 Sheets-Sheet 2

Patented May 25, 1954

2,679,182

UNITED STATES PATENT OFFICE 2,679,182

APPARATUS FOR MEASURING CHANGES IN FLUID FLOW VELOCITY

Ronald R. Proctor, Evanston, and Don J. Wangelin, Northfield, Ill., assignors to The Pure Oil Company, Chicago, Ill., a corporation of Ohio Application August 26, 1948, Serial No. 46,276

10 Claims. (Cl. 88—14)

This invention relates to an apparatus for determining the effective permeability of earth strata, such as oil sands. More particularly, the invention relates to an apparatus for determining the effective permeability of an underground stratum by measuring directly the rate of flow of the fluids thereinto.

The permeability of a porous medium to fluids is a measure of the capacity of that medium to transmit fluids, or its fluid conductivity, and is, therefore, the reciprocal of the resistance to flow. The effective permeability of a porous medium is the permeability of that medium to but one fluid phase of a multi-phase fluid system flowing through the medium.

Accordingly, it is an object of this invention to provide an apparatus for determining the rates of flow of liquids in a bore hole from which data the effective permeability of a sub-stratum within a bore can be deduced.

It is a second object of this invention to provide an apparatus for measuring the rate of flow of liquid at points along the entire depth of the bore.

A third object of this invention is to provide an apparatus for recording flow data during the process of measurement from which porosity or permeability of strata can be determined.

A fourth object of this invention is to provide a photoelectric apparatus for taking and recording flow measurements within a well from which data permeability determinations can be made.

Other objects and advantages of this invention will become apparent to those skilled in the art as the description thereof proceeds.

The apparatus comprises in combination, means for coloring a liquid flowing in an earth bore and for measuring and recording the degree of coloration thereof along the earth bore in synchronism with movement of the apparatus through the earth bore. Thus, the apparatus includes a color injector, source of motive power and color intensity recorder. In determining permeability of strata along the earth bore, synchronized determination of position or rate of passage of the apparatus through the earth bore and rate of flow of liquid at points in the earth bore are made and by elimination of the time factor are converted into measurements of rate of flow of liquid into formations at specific levels in the earth bore.

The invention in a preferred physical embodiment will be more completely understood by reference to the drawings in which;

Figure 1 is a diagrammatic representation showing an arrangement of elements constituting the apparatus;

Figure 2 is a detailed showing of the upper half of a color injector and part of the structure of the carrier for the apparatus.

Figure 3:
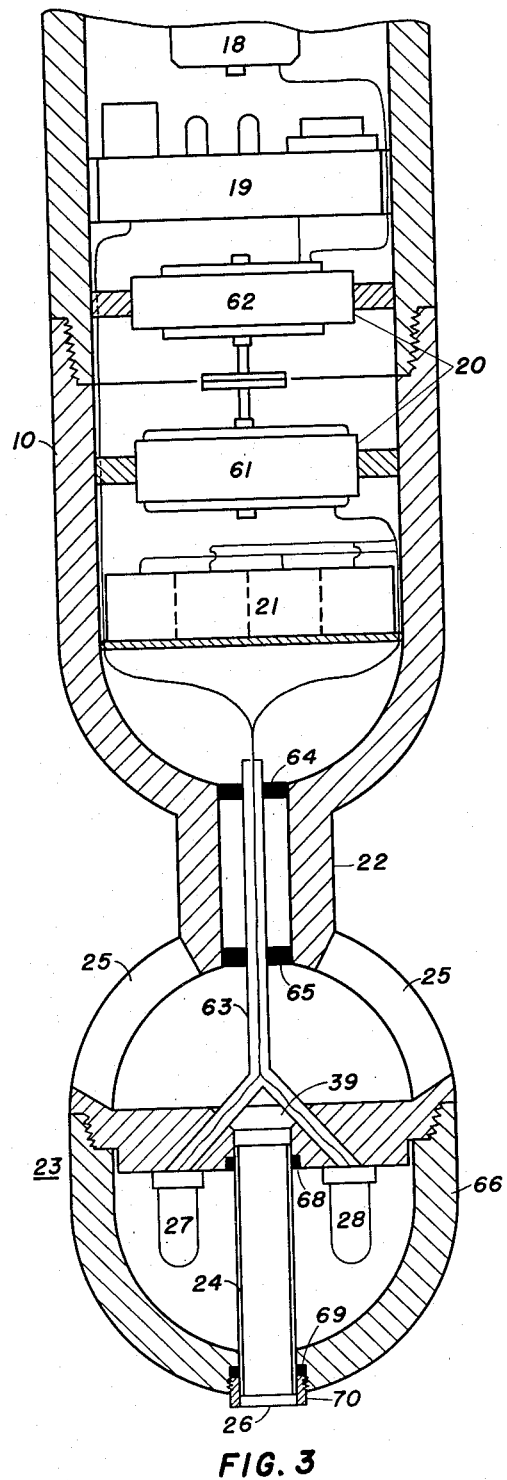
Figure 3 is a detailed showing of the lower half of the apparatus.

In Figure 1, an elongated cartridge 10 preferably cylindrical in form, provides a housing for the component parts of the apparatus. Because hydrostatic pressures in deep oil wells reach substantial levels, it is well to make the cartridge heavy enough to withstand pressures of at least as high as 5,000 pounds per square inch. Likewise, it should be made of stainless steel or some equally good corrosion resistant material, because corrosion conditions in oil wells are frequently serious. The cartridge has orifices 11 provided at the top in order to equalize hydrostatic pressures for the operation of a dye or color injector 12 normally located in the upper end of the apparatus. Immediately below the dye injector are located restricted orifices 13, 14, 15 for passage of dye out into a water stream flowing past and around the cartridge. Sixteen (16) represents a plug sealing the remainder of the apparatus within the cartridge.

Within the sealed portion of the cartridge, there is located a recorder 17, motor 18, amplifier 19, motor generator unit 20, and batteries for power supply 21. Electrical connection is provided from cartridge 10 through tube 22 to measuring and detecting unit 23.

Within the detection unit 23, there is provided a transparent conduit 24 for colored liquid, which has inlet 25 and exit 26. Within a sealed chamber along the side of said transparent conduit there is located light source 27 and oppositely oriented beside said conduit there is detecting unit 28 which is essentially a photoelectric cell. Electrical connections are made by means of wires from the sealed light source and detecting unit through sealed conduit 22 to the other parts of the apparatus in the cartridge 10.

The primary power supply consists of a group of batteries which energize those parts of the apparatus operable with direct current and also drive those units which convert direct to alternating current. The light source and photoelectric cell can be both energized by the direct current taken directly from the batteries. Connection from the photocell is made to an amplifier which is of standard construction, the electrical connections of which are not shown in detail.

Normally this includes an electrical network actuating a self-balancing motor and slidewire arrangement as found in ordinary self-balancing potentiometers. The amplifier is energized by motor generator set 20 which is a standard unit including a direct current motor driving an alternating current generator. A vibrator type inverter can be used in place of the motor-generator if desired. The alternating current thus generated is used to energize the amplifier which in turn operates the recorder motor 18.

The apparatus is suspended within the bore by attachment of the eye 29 to cable 30 which passes up through the well and through gland 31 of water inlet 32. Cable 30 is fed over pulley 33 and its rate of feed is controlled by windlass 34. To determine the position of the cable or rate of feed of the cable and thereby to determine the position or rate of ascent and descent of the apparatus through the bore, pulley 33 is coupled through shaft 35 and gear reducer 36 to recorder unit 37 which is a conventional pen-and-chart position recording unit in which the chart is driven at a uniform timed rate. A trace representing the movement of the apparatus is drawn on the chart by pen 38.

Referring now to Figure 2, there is shown in some detail the dye injection apparatus as essentially a spring loaded injector. Closely fitted within the shell 10 there is a liner 40 having a restricted orifice 41 closed by a solenoid valve 42. Within the liner, there is a relatively closely fitting bellows 43 integrally joined at its open end to the liner 40 to define a dye chamber 44 between its outside surface and the inside surface of the liner. The bellows encloses a piston 45 loaded by spring 46. An orifice closed by a cap 47 provides access to the chamber defined by the bellows and the liner. It will be seen that the structure thus defined provides a closed chamber subjected to the same pressure on all the exterior surfaces thereof so that the only pressure differential exerted on liquid enclosed within the chamber 44 is that exerted by spring 46. Thus, when the apparatus is lowered into the well and solenoid valve 42 opened, spring 46 will exert a force on the liquid in the chamber such that substantially uniform discharge thereof through orifice 41 will take place. The discharged dye solution is ejected through the several conduits 48, 49, and into the water stream through restricted orifices 13, 15, on the cartridge so that it mixes with the water around the exterior of the apparatus.

From Figure 2, the general assembly and some detail of the apparatus are apparent. It will be seen that the showing of cartridge 10 includes two parts, a cylindrical body 50 and a cap 51 which are coupled by a threaded joint at the head of the body 50. Sealing the body 50 from the entry of liquid, is plug 52 which closes the chamber 53 for the inclusion of a recording unit which, in this embodiment, is immediately below the closure. Some detail of the recording unit is shown and it consists of a timing motor 54 coupled to shaft 55, which times and drives the drum 57 carrying a recording chart. The pen 58, being positioned by the worm gear 56 and motor 18, is placed and synchronized so that a plot of color concentration versus time is obtained when the apparatus is energized by the power supply. The remaining units included in the cartridge with the recording apparatus are of substantially standard construction and details are not shown.

Electrical connection is made in the apparatus so that the complete combined operation of lowering the apparatus and injecting the dye at a constant or known rate is properly synchronized. For so doing, the entire apparatus is energized by the closing of a single switch which is made to operate at a known time by employment of a suitable time delay mechanism. This is readily accomplished by energizing the several motors and the amplifier in the apparatus by operation of time delay switch 60 which closes the circuit at a predetermined instant.

For the measurement of the permeability of the several strata occurring in a well, the apparatus is lowered into the well bore and the electrical master switch 60 is set with an appropriate time delay. Between the time of setting switch 60 and the commencement of a measurement, it is merely necessary to close the apparatus by setting plug 52 and cap 51 in place. At the expiration of the time delay, switch 60 closes and energizes all the electrical parts of the apparatus causing them to commence operation substantially simultaneously. With the opening of the solenoid valve 42, dye injector 12 is opened and spring loaded diaphragm or bellows 43 proceeds to inject the dye solution at a known constant rate into the water stream flowing past the apparatus. The rate of lowering of the apparatus into the well bore will be much slower than the rate of flow of water down the well bore. Thorough mixing of the dye and water occurs in the interval between the point of dye injection and the point at which the water passes through the detection unit. Since the amount of dye in a given quantity of water depends upon the rate of flow of the water past the injector, the more rapid the flow of water into the earth below the apparatus the more dilute will be the dyed water passing through the detecting unit. Small changes of a very dilute dye concentration, due to changes in the rate of flow of water as it passes from the well bore into the numerous strata at various rates, will give a measurable signal as it passes through the detection unit. In this way, the record of the concentration of the dye in the water injector at the detection unit 23 is obtained. During the passage of the apparatus through the bore hole, the surface cable feed and recording mechanism plots the level at which the apparatus is located against time. Upon completion of a single pass through the well or any portion of the well, the correlation of these two records, concentration of color versus time and apparatus location versus time, will give a measure of the change of light transmission or concentration of dye with the depth. Since the concentration of dye is inversely proportional to the velocity of flow past the apparatus, the end result will be a record of water velocity versus depth.

In Figure 3 there is shown in partial section the lower half of the apparatus. The recorder motor 18 may be a two-phase motor, as manufactured by The Brown Instrument Company. The amplifier 19 may be of the type manufactured by The Brown Instrument Company and described in their Bulletin No. 15–6 as a self-balancing "Electronik" amplifier. The motor generator combination 20 operates as a D. C.—A. C. converter. One suitable type of D. C.—A. C. converter is described in Radio's Master Catalog, 14th edition, page M-45, the Carter Super Dynamotor. Motor 61 is a direct current motor operating from batteries 21 and driving generator 62. Wiring connections communicate from batteries and motor generator combination 20 to the light 27, and from amplifier 19 to the photocell 28 through conduit 63. Conduit 63 is made water-tight by seals 64 and 65. Conduit 63 has two sealed branches leading to light 27 and photocell 28.

The detection unit 23 of Figure 3 has cover 66, which is threaded to the lower end of tube 22. Multiple inlets 25 communicate with transparent tube 24 through opening 39 to allow well fluid containing injected dye to pass through transparent conduit or tube 24 and alter the effective concentration of light falling on photocell 28, after which the water is discharged through exit 26. Tube 24 is held in water-tight relationship with tube 22 and cover 66 by means of seals 68 and 69 and plug 70.

Figure 4:
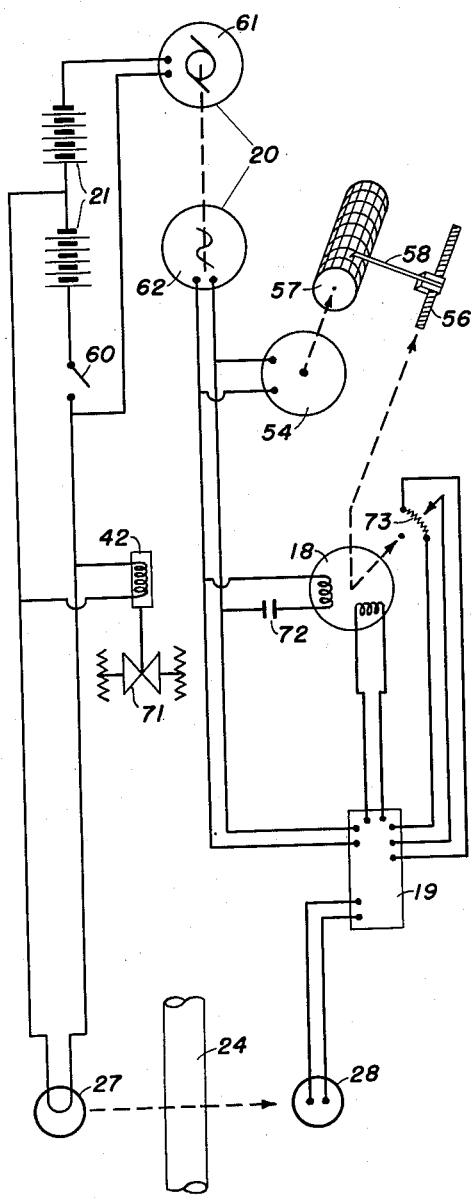
Figure 4 is a circuit diagram of the apparatus.

Figure 4 is a wiring diagram of the component parts of the apparatus. Upon operation of the time delay switch 60, batteries 21 supply direct current to motor 61, which serves to drive the alternating current generator 62. Direct current from batteries 21 is also furnished to light 27 and solenoid 42, which opens valve 71. Alternating current is supplied by generator 62 to chart drive motor 54 and to one phase of the two-phase motor 18 through phase-shifting capacitor 72. Amplifier 19 provides an alternating current voltage for the second phase of the two-phase motor 18, and a direct current voltage for polarizing photoconductive cell 28 when such a cell is used. If a photo-electric cell (which generates a direct current voltage proportional to the amount of light impinging upon it) is used, no polarizing voltage is required, and the two leads connecting photocell 28 and amplifier 19 serve merely to conduct the direct current signal to the converter unit in the amplifier.

The function of the continuous balance potentiometer and amplifier 19 is described in The Brown Instrument Company Bulletin No. 15-6. One function of amplifier 19 is to convert the variable direct current signal from photocell 28 to alternating current and amplify it to drive motor 18. The other component parts of the apparatus are shown as timing motor 54 which may be fitted with a self-contained gear reduction unit to provide any desired speed of rotation of chart drum 57. Single grooved cylindrical cam 56 is actuated by motor 18 to move pen 58 in accordance with the signal received by photocell 28. The arrangement of pen 58, cam 56, and drum 57 may be of the types described in United States Patents 1,927,402 by T. R. Harrison and 1,930,496 by C. H. Wilson, et al. The time delay switch 60 is the ordinary type of time delay switch adapted to make contact after a predetermined time through a built-in clock mechanism. Such an instrument is obtainable from the Paragon Electric Co., R. W. Cramer Co., or other manufacturers.

On actual operation of the apparatus, it is lowered into the well bore with the time delay switch set at a predetermined time calculated to start the apparatus at the desired position in the well bore. When time delay switch 60 is actuated, the solenoid valve 42 opens and light 27 receives current. At the same time, the motor generator 20 is actuated, which energizes the amplifier 19 and one field of the recorder motor 18. When the photocell output changes due to a change in light, as influenced by color concentration changes within tube 24, this unbalances the electrical network in amplifier 19 and thereby causes the two-phase motor 18 to turn in the right direction and operate the pen 58. At the same time motor 18 rebalances the electrical network in the amplifier through the slide wire 73. Pen 58 will thereby assume a position corresponding to a given value of light transmission through tube 24, and will change position when the light transmission changes. Since the light transmission will vary with the flow of water past and through the instrument, pen 58 will in time trace a record of flow vs. time on chart 57.

Though the application has dealt with but a single embodiment of the apparatus, the nature and scope of the invention should be apparent. It is, accordingly, intended that the description be illustrative and not restrictive of the invention.

What is claimed is:

1. An apparatus for making fluid intrusion studies of a well bore wherein water is being injected into a plurality of strata comprising, in combination, a housing, means connected to said housing for lowering the housing into the well bore adjacent said strata, means within said housing including an electrically operated value for injecting a coloring agent into the water, means within said housing at a point below the point of injection of coloring agent for obtaining an electrical signal in proportion to the concentration of said coloring agent, means responsive to said signal for recording the concentration of said coloring agent, and a time delay switch electrically connected to said injecting means, said measuring means, and said recording means in order to energize them in synchronism.

2. An apparatus in accordance with claim 1 in which the means for injecting a coloring agent comprises, in combination, a flexible bellows, a spring for actuating said bellows, a member surrounding said bellows to define a dye chamber, an orifice through said member leading from said chamber, the said valve being a solenoid actuated valve to control the flow of coloring agent through said orifice.

3. An apparatus, in accordance with claim 1, in which the means for detecting the concentration of coloring agent comprises a photoelectric cell spaced from said injecting means and a self-balancing potentiometric amplifier responsive to the photo-electric cell.

4. An apparatus in accordance with claim 1 in which the means for recording the concentration of coloring agent comprises, in combination, a grooved cylindrical cam, a follower on said cam, a motor to drive said cam, a recording pen operably attached to said follower, a time recording drum in operable relationship to said pen and adapted to record color concentration against time, a motor to drive said time recording drum.

5. An apparatus for measuring changes in the velocity of fluid flow within a conduit comprising, in combination, a housing adapted to be passed through a conduit in which a fluid is flowing, a dye injector within said housing adapted to inject a dye into said fluid at a constant rate, comprising a hollow member flanged inwardly at the top to form a constricted opening communicating with the outside of said housing, a second opening in the bottom of said hollow member also communicating with the outside of said housing, a flexible diaphragm across the inside of said hollow member to define a dye chamber communicating with said second opening and a fluid chamber communicating with said constricted opening, means for expanding said diaphragm at a constant rate toward said second opening and expel dye therefrom, a solenoid valve to open and close said second opening, photoelectric means within said housing at a point removed downstream from said dye injector, a light source adjacent said photoelectric means, means for conducting dye colored fluid between said photoelectric means and said light source, an amplifier operably connected to said photoelectric means to transform the signal therefrom to electric power, a recorder operably connected to said amplifier, an electrical power supply connected to said amplifier, solenoid, photoelectric means and said light source, and a time delay switch to energize said power supply.

6. An apparatus, in accordance with claim 5, in which said flexible diaphragm is a bellows and the means for expansion thereof includes a spring-activated piston, said amplifier includes a self-balancing potentiometric amplifier and said recorder includes, in combination, a helical cam, a motor to rotate said cam, a follower on said cam, a recording pen operably attached to said follower, a time recording drum cooperating with said pen, a motor to drive said drum, said recording drum and pen adapted to record dye concentration against time.

7. An apparatus for measuring changes in the velocity of flow of a fluid within a well bore wherein said fluid is being injected into a plurality of strata comprising, in combination, a housing, means connected to said housing for lowering the same into said well bore adjacent said strata, means within said housing for injecting into said fluid a liquid agent adapted to alter the degree of light transmission of said fluid in said bore, and means located a fixed distance below said housing for obtaining an electrical signal in proportion to the change in light transmission due to the presence of said liquid agent in said fluid.

8. An apparatus in according with claim 7 in which said means for obtaining an electrical signal in proportion to the change in light transmission is a photoelectric cell.

9. An apparatus in accordance with claim 7 in which said means for injecting a liquid agent includes an electrically operated valve.

10. An apparatus for making fluid intrusion studies of a well bore wherein water is being injected into a plurality of strata comprising, in combination, a housing, means connected to said housing for lowering the housing into the well bore adjacent said strata, means within said housing including an electrically operated valve for injecting a coloring agent into the water, means within said housing at a point below the point of injection of the coloring agent for obtaining an electrical signal in proportion to the concentration of said coloring agent, and means responsive to said signal for recording the concentration of said coloring agent.

References Cited in the file of this patent

UNITED STATES PATENTS

| Number | Name | Date |
|---|---|---|
| 1,122,710 | Feit | Dec. 29, 1914 |
| 1,808,709 | Blake | June 2, 1931 |
| 1,837,222 | Kannenstine | Dec. 22, 1931 |
| 1,927,402 | Harrison | Sept. 19, 1933 |
| 1,930,496 | Wilson et al. | Oct. 17, 1933 |
| 1,977,359 | Styer | Oct. 16, 1934 |
| 2,283,429 | Ennis | May 19, 1942 |
| 2,353,382 | Barrett | Nov. 11, 1944 |
| 2,453,456 | Piety | Nov. 9, 1948 |
| 2,471,852 | Bau | May 31, 1949 |